United States Patent
Vinokour et al.

(10) Patent No.: US 7,860,981 B1
(45) Date of Patent: Dec. 28, 2010

(54) SYSTEMS AND METHODS FOR IP SESSION KEEPALIVE USING BFD PROTOCOLS

(75) Inventors: Vitali Vinokour, Arlington, MA (US); Sanjay Wadhwa, Acton, MA (US); Jerome Moisand, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 604 days.

(21) Appl. No.: 11/537,095

(22) Filed: Sep. 29, 2006

(51) Int. Cl.
*G06F 15/16* (2006.01)

(52) U.S. Cl. .................. 709/227; 370/241; 709/223; 709/224

(58) Field of Classification Search .................. 709/227
See application file for complete search history.

(56) References Cited

U.S. PATENT DOCUMENTS

| 7,499,395 | B2* | 3/2009 | Rahman et al. | 370/229 |
|---|---|---|---|---|
| 7,561,527 | B1* | 7/2009 | Katz et al. | 370/241 |
| 2006/0209685 | A1* | 9/2006 | Rahman et al. | 370/229 |
| 2006/0285500 | A1* | 12/2006 | Booth et al. | 370/250 |
| 2007/0165515 | A1* | 7/2007 | Vasseur | 370/216 |
| 2007/0180104 | A1* | 8/2007 | Filsfils et al. | 709/224 |
| 2007/0180105 | A1* | 8/2007 | Filsfils et al. | 709/224 |
| 2007/0189177 | A1* | 8/2007 | Zhai | 370/244 |
| 2007/0207591 | A1* | 9/2007 | Rahman et al. | 438/439 |
| 2007/0280102 | A1* | 12/2007 | Vasseur et al. | 370/225 |
| 2009/0016213 | A1* | 1/2009 | Lichtwald | 370/225 |

OTHER PUBLICATIONS

Katz et al; "Bidirectional Forward Detection draft-ietf-bfd-base-00.txt;" Network Working Group; Jul. 2004.*
Rahul Aggarwal; "Application of Bidirectional Forward Detection (BFD);" Juniper Networksp; May 2004.*
RIPE 48 presentations Archive; May 2004.*
Katz et al; "Forwarding Plane Failover Detection;" www.nonog.org; Jun. 2003.*
Architecture and Transport Working Group, "Subscriber Sessions", DSL Forum, Working Text WT-146 Draft Version 2.43, May 2007, 28 pages.
D. Katz et al., "Bidirectional Forwarding Detection", The Internet Society, Jun. 2006, 45 pages.
D. Katz et al., "BFD for IPv4 and IPv6", The Internet Society, Oct. 2005, 13 pages.

* cited by examiner

*Primary Examiner*—Firmin Backer
*Assistant Examiner*—Hamza Algibhah
(74) *Attorney, Agent, or Firm*—Harrity & Harrity, LLP

(57) ABSTRACT

A network device may include logic to establish an IP session, establish a BFD session within the established IP session, transmit BFD packets within the established BFD session, and determine that the established IP session is active based upon reception of the BFD packets. In another embodiment, the logic may also determine that an IP session is active using an inactivity timer that may also trigger transmission of BFD packets.

20 Claims, 6 Drawing Sheets

US 7,860,981 B1

SYSTEMS AND METHODS FOR IP SESSION KEEPALIVE USING BFD PROTOCOLS

FIELD OF THE INVENTION

Implementations consistent with the systems and methods described herein relate generally to computer and data communications and, more particularly, to techniques for detecting failures in computer and data communications.

BACKGROUND OF THE INVENTION

Network service providers, such as Internet service providers (ISPs), typically allocate network resources upon creation of an IP session. For various reasons, an IP session may fail. Current methods of detecting failed connections in IP sessions do not provide timely detection and notification of IP session failures.

SUMMARY OF THE INVENTION

One aspect is directed to method that comprises establishing an IP session, establishing a BFD session within the established IP session, receiving BFD packets within the established BFD session, and determining that the established IP session is active based upon receiving the BFD packets. The method may further include establishing a BFD session between an IP edge device and a remote IP device, wherein either the IP edge device or the remote IP device may determine that the IP session is active. The method may further include transmitting and receiving BFD packets using one of a BFD asynchronous mode or BFD demand mode.

Another aspect is directed to a network device that comprises logic configured to: establish an IP session, establish a BFD session within the established IP session, receive BFD packets, and determine whether the IP session is active, based on a number of received BFD packets. The network device may be one of an IP edge device or a remote IP device. In another aspect, data received by the network device from the remote IP device determines whether the IP session is active. In another aspect, if data is not received by the network device within a predetermined time period set by an inactivity timer, the expiration of the inactivity timer may trigger transmission of BFD packets by the network device.

BRIEF DESCRIPTION OF THE DRAWINGS

The accompanying drawings, which are incorporated in and constitute a part of this specification, illustrate one or more embodiments and, together with the description, explain the system and methods. In the drawings.

DETAILED DESCRIPTION

The following detailed description of implementations consistent with systems and methods described herein refers to the accompanying drawings. The same reference numbers in different drawings may identify the same or similar elements. Also, the following detailed description does not limit the implementations. Instead, the scope of the systems and methods described herein is defined by the appended claims and their equivalents.

Exemplary System

Figure 1:
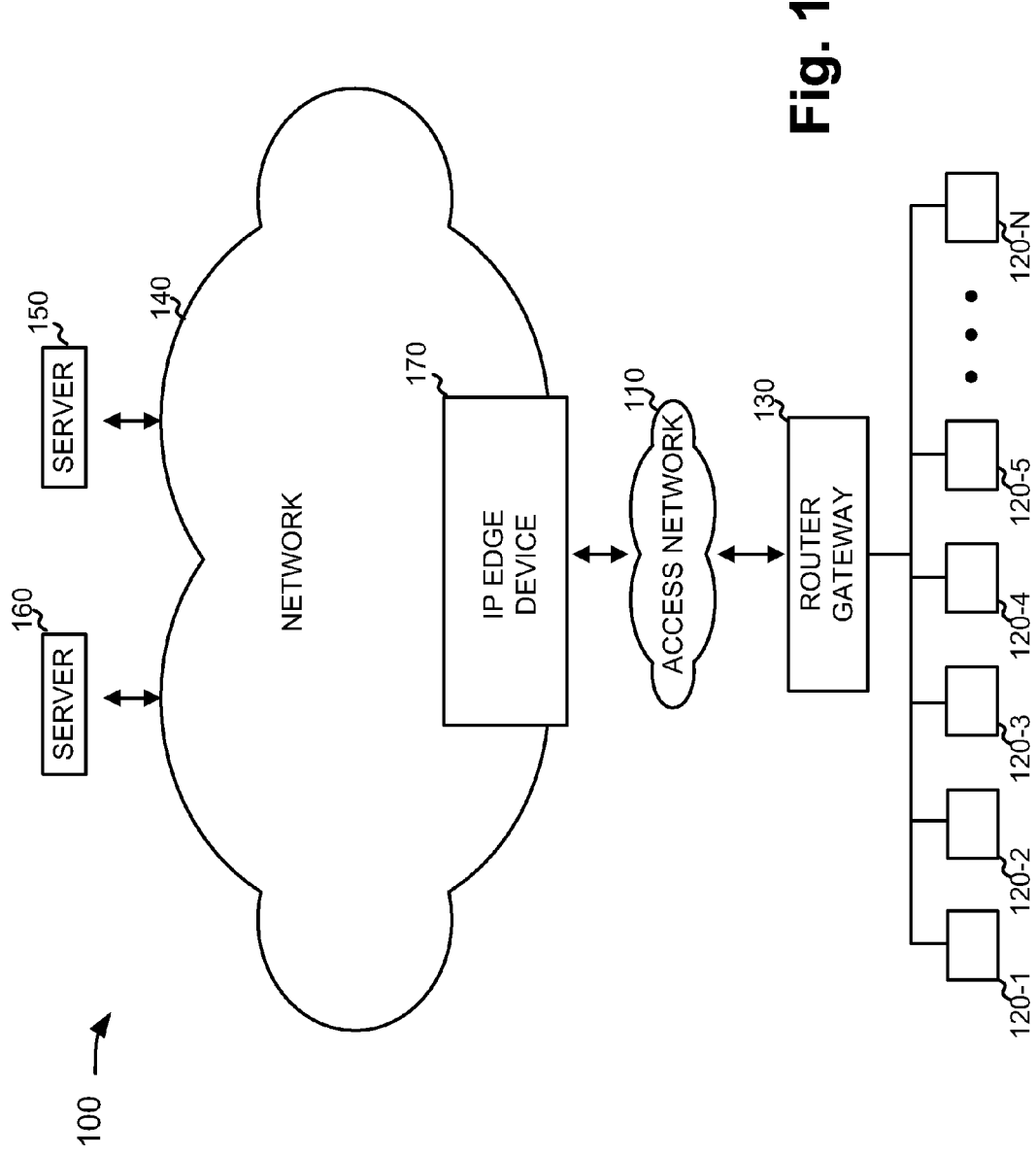
FIG. 1 is a diagram of an exemplary system in which systems and methods may be implemented.

FIG. 1 is a diagram of an exemplary system 100 in which systems and methods described herein may be implemented. As illustrated, system 100 may include an access network 110, subscriber devices 120-1 to 120-N, router gateway 130, network 140, servers 150 and 160, and IP edge device 170. It will be appreciated that the number of devices illustrated in FIG. 1 is provided for simplicity. In practice, a typical system may include more or fewer devices than illustrated in FIG. 1. Moreover, system 100 may include other devices (not shown) that aid in the reception, processing, and/or transmission of data.

Access Network 110 may include any network capable of transferring a data unit. "Data unit," as used herein, may refer to any type of machine-readable data having substantially any format that may be adapted for use in one or more networks, such as access network 110. A data unit may include packet data and/or non-packet data. Implementations of access network 110 may include a network that connects a network 140 to a router gateway 130. Access network 110 may be constructed as a Layer 2 network (data link layer) in the Open Systems Interconnection (OSI) reference model. Access Network 110 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Subscriber devices 120-1 through 120-N (collectively referred to as subscriber devices 120) may include any device capable of transmitting and/or receiving data from access network 110. For example, subscriber devices 120 may include a personal computer, a laptop computer, a personal digital assistant (PDA), a television, a telephone device, a video game console a web-enabled cellular telephone, or another computation or communication device. Subscriber devices 120 may connect to router gateway 130 via any type of connection, such as wired, wireless, and/or optical connections.

Router gateway 130 may include a device capable of receiving data from subscriber devices 120 and routing the data to/through access network 110. Router gateway 130 may also receive data from access network 110 and route the data to the appropriate subscriber device 120. In one implementation, router gateway 130 may be a public interface to access network 110. In another implementation, router gateway 130 may include a digital subscriber line access multiplexer (DSLAM). Router gateway 130 may operate in cooperation with servers 150 and 160 to provide respective communication services to subscriber devices 120, for example.

Network 140 may include any network capable of transferring a data unit as described above. Implementations of network 140 may include local area networks (LANs), public switched telephone network (PSTN), metropolitan area networks (MANs) and/or wide area networks (WANs), such as the Internet, that may operate using substantially any network protocol, such as Internet protocol (IP), asynchronous transfer mode (ATM), and/or synchronous optical network (SONET). Network 140 may include network devices, such as routers, switches, firewalls, and/or servers (not shown). Network 140 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Server 150 may include one or more processors or microprocessors enabled by software programs to perform functions, such as data storage and transmission, codex conversion, and interfacing with server 160 and IP edge device 170, for example. Server 150 may also include a data storage memory such as a random access memory (RAM) or another dynamic storage device that stores information such as subscriber device information for establishing IP and BFD sessions, as described in detail below.

Server 150 may also include a communication interface that may include any transceiver-like mechanism that enables server 150 to communicate with other devices and/or systems. For example, server 150 may include a modem or an Ethernet interface to a LAN. In addition, server 150 may include other mechanisms for communicating data via a network, such as a wireless network. For example, server 150 may include one or more radio frequency (RF) transmitters and receivers for transmitting and receiving (RF) signals.

Server 150 may include a computer device that stores and/or runs applications to validate, establish and monitor IP and BFD protocol sessions. Server 150 may also be configured as a RADIUS server to provide and/or aid in providing media content to subscribers associated with subscriber devices 120. For example, media content may be transmitted in an established static IP session in a DSL connection. Media content may include, for example, video-on-demand, live or pre-recorded television or radio broadcasts, streaming music, on-line gaming, or other voice and/or video content. In fact, media content may include any content that is stored or dynamically generated in real-time on one or multiple network devices.

Server 160 may include one or more processors or microprocessors enabled by software programs to perform functions, such as data storage and transmission, codex conversion, and interfacing with server 150 and IP edge device 170, for example. Server 160 may also include a data storage memory such as a random access memory (RAM) or another dynamic storage device that stores information. Server 160 may also include a communication interface that may include any transceiver-like mechanism that enables server 160 to communicate with other devices and/or systems. For example, server 160 may include a modem or an Ethernet interface to a LAN. In addition, server 160 may be configured as a DHCP server that stores and/or runs applications to provide network resources to subscriber devices 120.

IP Edge Device (IPED) 170 may include hardware or software logic to store information related to routing of data between servers 150 and 160 and subscriber devices 120, via router gateway 130 and access network 110. In one implementation, IPED 170 may establish and monitor IP and BFD protocol sessions, between for example, subscriber devices 120 and/or router gateway 130 and server 160. In another implementation, IPED 170 may be configured as a broadband network gateway or a BRAS server, for example.

IPED 170 may include computer devices that retrieve subscriber profile information from server 150, for example. Subscriber profile information may include a subscriber IP address and information necessary to validate and establish IP sessions and to establish and create BFD protocol sessions. IPED 170 may be implemented in hardware, software, or a combination of hardware and software. An exemplary IPED 170 is described below with reference to FIGS. 2-3.

Exemplary IPED Configuration

Figure 2:
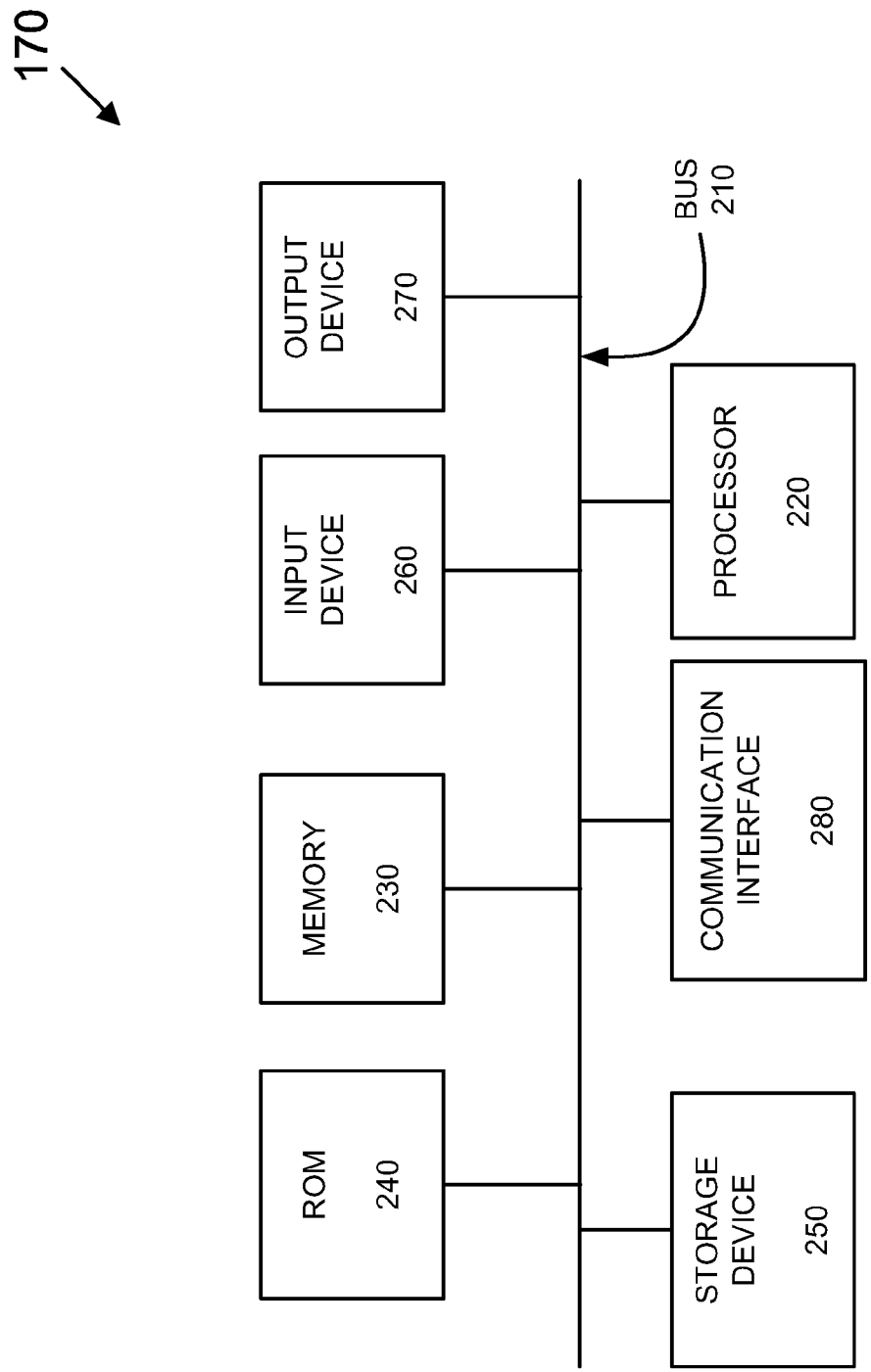
FIG. 2 is an exemplary diagram of the IP edge device of FIG. 1.

FIG. 2 illustrates an exemplary architecture for implementing IPED 170 of FIG. 1. It will be appreciated that subscriber devices 120, router gateway 130, servers 150 and 160 and/or other devices in system 100 may be similarly configured. As illustrated in FIG. 2, IPED 170 may include a bus 210 that may include one or more interconnects that permit communication among a processor 220, a memory 230, a read only memory (ROM) 240, a storage device 250, an input device 260, an output device 270, and a communication interface 280.

Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220. ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit an operator to input information to servers 150 and 160, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, etc.

Communication interface 280 may include any transceiver-like mechanism that enables IPED 170 to communicate with other devices and/or systems, such as subscriber devices 120, router gateway 130, and servers 150 and 160. For example, communication interface 280 may include one or more interfaces, such as a first interface coupled to subscriber device 120 and/or a second interface coupled to access network 110, and/or a third interface coupled to network 140.

IPED 170 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with principles of the embodiments. Thus, implementations consistent with principles of the embodiments are not limited to any specific combination of hardware circuitry and software.

Exemplary IPED Functional Diagram

Figure 3:
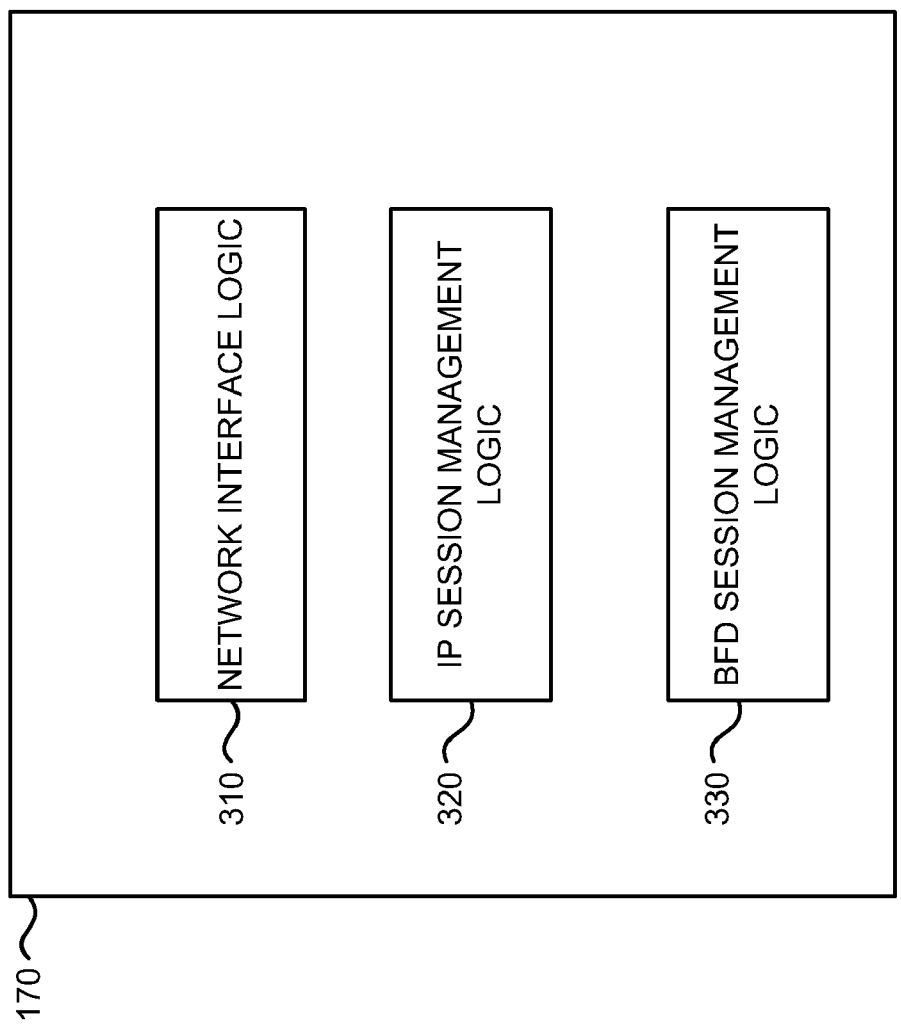
FIG. 3 illustrates an exemplary functional diagram of the IP edge device of FIG. 2.

FIG. 3 illustrates an exemplary functional diagram of IPED 170 of FIG. 2. The functional diagram of FIG. 3 may include network interface logic 310, IP session management logic 320, and Bidirectional Forwarding Detection (BFD) session management logic 330. The implementation of FIG. 3 is exemplary, and IPED 170 may include more or fewer functional components without departing from the spirit of the embodiments. In other embodiments, router gateway 130 may contain similar components. In one embodiment, IPED 170 may be configured to function as a DHCP server or as a DHCP Relay/Proxy.

Network interface logic 310 may include hardware or software to route data between subscriber devices 120 and servers 150 and 160 according to applicable network policies. In one implementation, network interface logic 310 may establish a network interface between subscriber devices 120 and network 110 upon receiving a connection request from subscriber devices 120. In one implementation, network interface logic 310 may configure a virtual router associated with an established network interface. Network interface logic 310 may assign network addresses to the respective network interfaces. In one implementation, the network interface may include routes for data transmissions to/from subscriber devices 120 and routes to/from servers 150 and 160. Network interface logic 310 may be implemented in communication interface 280 or elsewhere in IPED 170.

IP session management logic 320 may include hardware or software for IPED 170 to process instructions or data related to establishing and maintaining an IP session. For example, IP session management logic 320 may be implemented in processor 220 and may make IP session information available to another device, software module, or component operating in IPED 170, such as BFD session management logic 330. IP session management logic 320 may include IP session information that identifies one or more network parameters and policies related to subscriber device 120. In one implementation, IP session management logic 320 may include IP session information downloaded from server 150, via network interface logic 310, for example. An IP session may be established between IPED 170 and a remote IP device, such as router gateway 130 or subscriber device 120, for example.

BFD session management logic 330 may include hardware or software to process instructions or data related to establishing and maintaining Bidirectional Forwarding Detection (BFD) protocol sessions. In one implementation, BFD session management logic 330 may notify network interface logic 310 and/or servers 150 and 160 of the creation and/or deletion of a BDF session. Bidirectional Forwarding Detection protocols enable data transfer between devices in the forwarding plane. In one implementation, BFD session management logic 330 may receive BFD session parameters and policies from server 150, via network interface logic 310. In another implementation, BFD session management logic 330 may automatically create a BFD session in response to the creation of an IP session. BFD session management logic 330 may store parameters relating to establishing and maintaining a BFD session such as a BFD session enable flag, a BFD mode (asynchronous or demand), a frequency or time period between BFD packet transmissions, a number of BFD packet polls unanswered indicating an IP session or connection failure and an alarms enable flag.

Exemplary Processing

Figure 4:
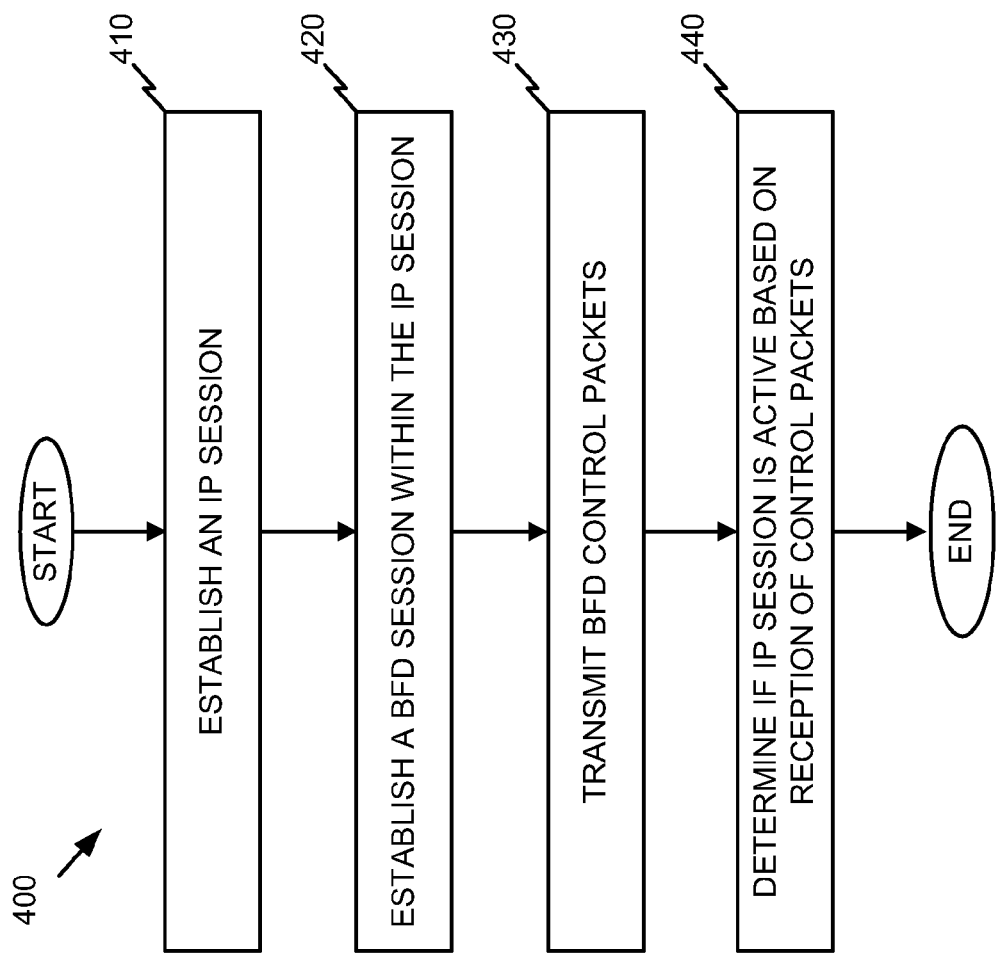
FIG. 4 illustrates exemplary processing performed by the IP edge device of FIG. 2.

FIG. 4 illustrates an exemplary process 400 to implement IP session monitoring using BFD protocol mechanisms. In one implementation, exemplary process 400 may be performed by IPED 170 and/or router gateway 130. Processing may begin, for example, by establishing an IP session (act 410). For example, an IP session may be established between router gateway 130 and IPED 170, in response to IPED 170 receiving an IP packet from subscriber devices 120, via router gateway 130. The established IP session may be a dynamically created IP session or a static IP session, for example. In response to receiving an IP packet, for example, IPED 170 may access server 150 for validation data and session parameters in order to establish an IP session. Once the IP session has been established, a BFD session may be established within the IP session (act 420). For example, IPED 170 may access BFD session parameters in server 150 and/or these BFD session parameters may be transmitted to IPED 170 when the IP session may have been validated and established. BFD parameters may include for example, the BFD mode of operation (asynchronous or demand), whether the BFD session is enabled, a frequency of BFD packet transmissions, a number of dropped BFD packet polls allowed and enablement of alarms.

In BFD asynchronous mode for example, IPED 170 may begin to transmit BFD Control packets using BFD protocols (act 430). For example, BFD Control packets may be transmitted from IPED 170 to router gateway 130 every 30 seconds. Router gateway 130 may also begin to transmit BFD Control packets to IPED 170 within the established BFD session (act 430). The frequency of BFD Control packets may be determined from the BFD session parameters contained in server 150 and/or IPED 170. In one embodiment, the IPED 170 and router gateway 130 may have different frequencies of transmitting BFD Control packets to one another. In another embodiment, the frequency of transmitting BFD Control packets may be manually adjusted, for example.

In accordance with the established BFD session parameters for example, IPED 170 may determine that an IP session is active based on receiving BFD Control packets (act 440). For example, IPED 170 may receive a BFD Control packet every 30 seconds from router gateway 130. If the IPED 170 does not receive BFD Control packets from router gateway 130 for 90 seconds, (3 polling periods) for example, IPED 170 may determine a failed connection and/or IP session (act 440). In response to this determination (act 440), the IP session may be terminated by IPED 170. IPED 170 may also determine that an IP session is inactive if a predetermined number of BFD Control packets are not received. For example, 3 failed receptions of BFD Control packets may determine that an IP session is inactive.

In another implementation, router gateway 130 may determine that the IP session is active upon receiving BFD Control packets from IPED 170 (act 440). For example, in the established IP and BFD sessions (acts 410 and 420), IPED 170 may transmit BFD Control packets to router gateway 130 (act 430). Router gateway 130 may determine that the IP session is active based on receiving BFD Control packets from IPED 170 (act 440). Router gateway 130 may also determine that an IP session is inactive based upon not having received a predetermined number of BFD Control packets from IPED 170, or may determine that an IP session is inactive when a BFD Control packet has not been received for a predetermined period of time, for example.

In the above embodiments, once an IP session is determined to be inactive, appropriate action may be taken, such as notifying an administrator or automatically attempting to renew the IP session.

Figure 5:
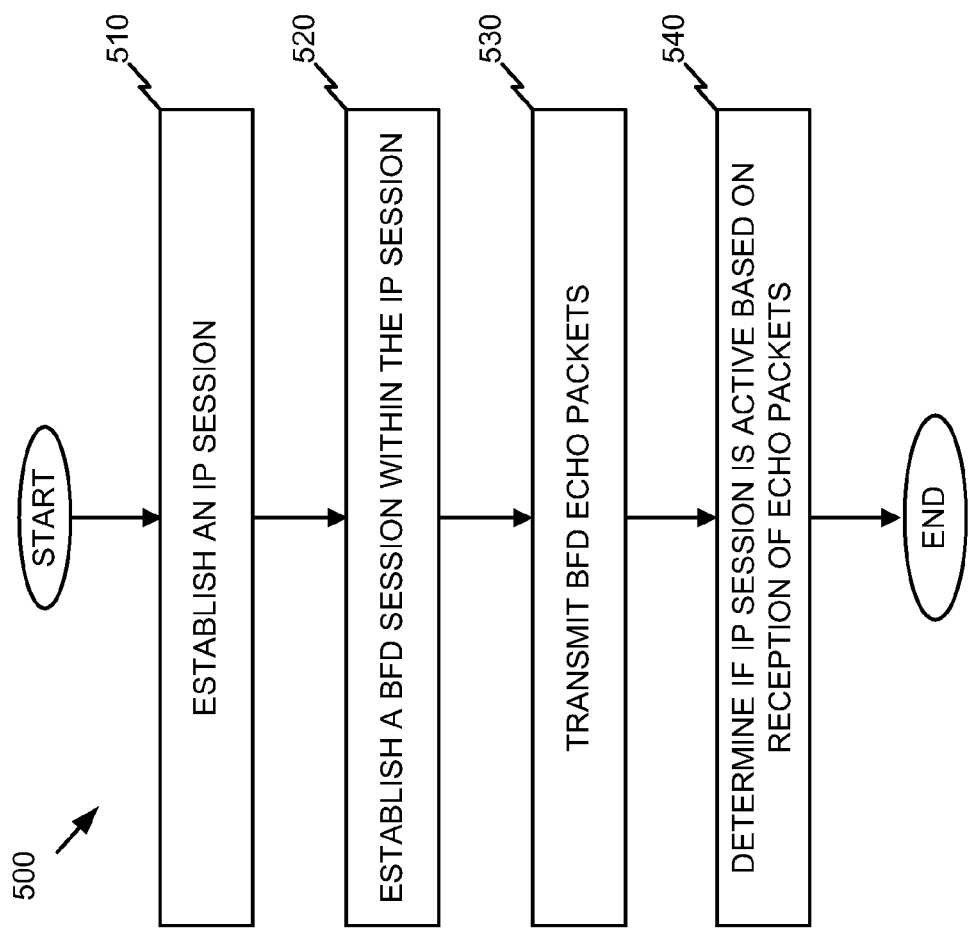
FIG. 5 illustrates another exemplary processing performed by the IP edge device of FIG. 2.

FIG. 5 illustrates an exemplary process 500 to implement IP session monitoring using another BFD protocol mechanism. In one implementation, exemplary process 500 may be performed by IPED 170. Processing may begin by establishing an IP session (act 510). For example, an IP session may be established between router gateway 130 and IPED 170, in response to IPED 170 receiving an IP packet from subscriber devices 120, via router gateway 130. The established IP session may be a dynamically created IP session or a static IP session, for example. In response to receiving an IP packet, IPED 170 may access server 150 for validation data and session parameters in order to establish the IP session. Once the IP session has been established, a BFD session may be established within the IP session (act 520). For example, IPED 170 may access BFD session parameters in server 150 and/or these BFD session parameters may be transmitted to IPED 170 when the IP session was validated and established. BFD parameters may include for example, the BFD mode of operation, whether the session is enabled, a frequency of BFD packet transmission, a number of dropped BFD packet polls allowed and enablement of alarms.

BFD demand mode may be used. In demand mode, IPED 170 may transmit BFD Echo packets using BFD protocols (act 530). For example, BFD "Echo packets" may be transmitted from IPED 170 to router gateway 130 (act 530). Echo packets are packets that are automatically transmitted back to IPED 170 from router gateway 130, without requiring control and negotiation of transmission parameters from router gateway 130. The BFD Echo packet originally transmitted from IPED 170 may then be automatically transmitted from router gateway 130 back to IPED 170. IPED 170 may then determine that the IP session is active upon reception of the BFD Echo packet from router gateway 130 (act 540).

In another embodiment, router gateway 130 may be configured to transmit BFD Echo packets to IPED 170. For example, once the IP and BFD sessions are established (acts 510 and 520), router gateway 130 may transmit BFD Echo packets to IPED (act 530). The BFD Echo packet originally transmitted from router gateway 130 may then be automatically transmitted from IPED 170 back to router gateway 130. Router gateway 130 may then determine that the IP session is active upon reception of the BFD Echo packet from IPED 170 (act 540).

Figure 6:
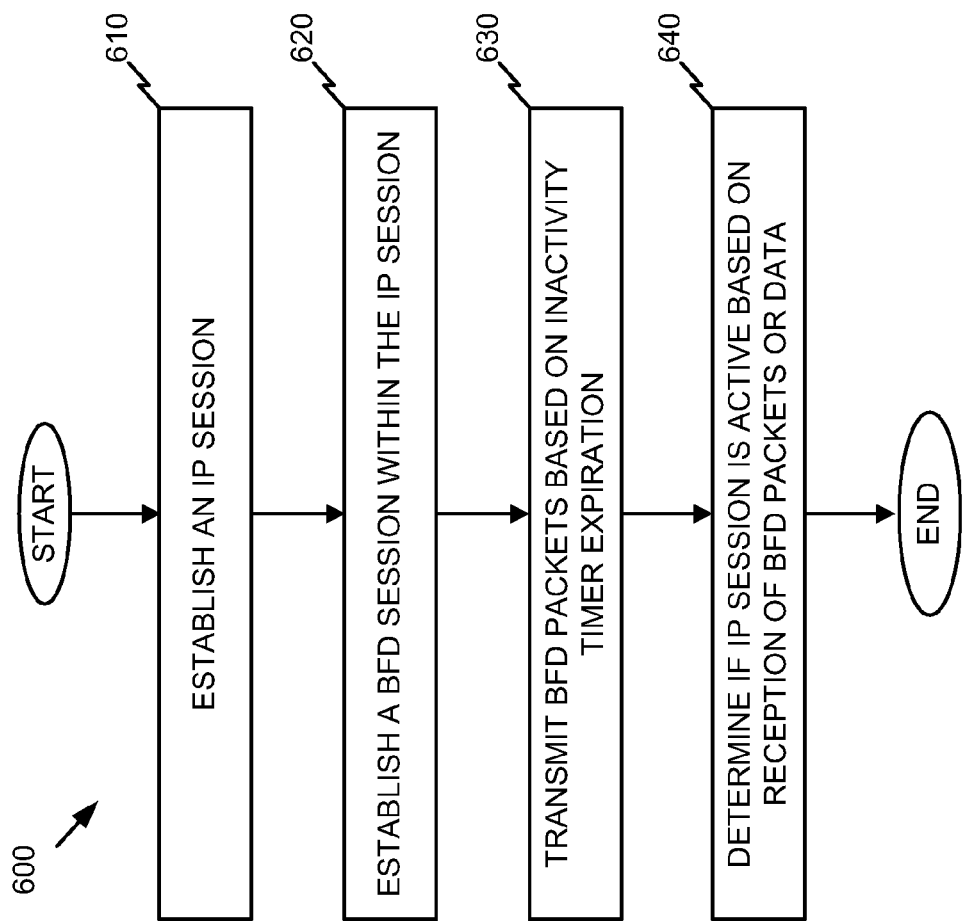
FIG. 6 illustrates another exemplary processing performed by the IP edge device of FIG. 2.

FIG. 6 illustrates an exemplary process 600 to implement IP session monitoring using BFD protocols and an inactivity timer mechanism. In one implementation, exemplary process 600 may be performed by IPED 170, or a remote IP device, such as router gateway 130. Processing may begin by establishing an IP session (act 610). For example, an IP session may be established between router gateway 130 and IPED 170, in response to IPED 170 receiving an IP packet from subscriber devices 120, via router gateway 130. The established IP session may be a dynamically created IP session or a static IP session, for example. In response to receiving an IP packet, IPED 170 may access server 150 for validation data and session parameters in order to establish the IP session. Once the IP session has been established, a BFD session may be established within the IP session (act 620). For example, IPED 170 may access BFD session parameters in server 150 and/or these BFD session parameters may be transmitted to IPED 170 when the IP session was validated and established. BFD parameters may include for example, the BFD mode of operation, whether the BFD session is enabled, a frequency of BFD packet transmission, an inactivity timer period, a number of dropped BFD packet polls allowed and enablement of alarms.

In exemplary process 600, an inactivity timer may be enabled in IPED 170 upon establishing the IP and BFD sessions (acts 610 and 620). An inactivity timer enabled in IPED 170 may set a predetermined period of time that may generate an alert when no data has been received from router gateway 130 for the predetermined period of time, for example. The time period may be manually configured or may be set by stored parameters upon establishment of the IP and BFD sessions. If, for example, IPED 170 receives data from subscriber device 120 and/or router gateway 130, the inactivity timer on IPED may be reset for the predetermined period of time, for example, 30 seconds. As long as IPED 170 receives data from subscriber device 120 and/or router gateway 130 within the predetermined period of time, the inactivity timer may not expire. If for example, no data has been received from subscriber device 120 and/or router gateway 130 within the predetermined period of time, the inactivity timer on IPED 170 may expire. In demand mode, the expiration of the inactivity timer may instigate BFD packets to be transmitted from IPED 170 to router gateway 130 (act 630).

In demand mode, IPED 170 may transmit BFD packets as Echo packets or Control packets using BFD protocols (act 630). As described above, BFD "Echo packets" may be transmitted from IPED 170 to router gateway 130 and may be automatically transmitted back to IPED 170 from router gateway 130, without requiring control and negotiation of transmission parameters from router gateway 130. A BFD Echo packet may be transmitted from IPED 170 may then be automatically transmitted from router gateway 130 back to IPED 170 (act 630), for example. IPED 170 may then determine that the IP session is active based upon reception of the BFD Echo packet from router gateway 130 (act 640). In this embodiment, IPED 170 may also determine that an IP session is active based on receiving data from subscriber device 120 and/or router gateway 130 (act 640), without transmitting BFD Echo packets (act 630). If for example, the inactivity timer expires, and BFD Echo packets are not received back by IPED 170, the IP session may be determined to be inactive (act 640).

Also using demand mode in another exemplary embodiment, IPED 170 may transmit BFD Control packets using BFD protocols (act 630). A BFD Control packet may be transmitted from IPED 170 in response to the expiration of an inactivity timer, for example. The BFD Control packet transmitted from IPED 170 may then be received by router gateway 130, for example. Upon receiving BFD Control packets from IPED 170, router gateway 130 may determine that the IP session is active (act 640). If for example, the inactivity timer expires, and BFD Control packets are transmitted from IPED 170 and the BFD Control packets are not received by router gateway 130, the IP session may be determined to be inactive (act 640). As described above for example, as long as IPED 170 receives data from router gateway 130 within the predetermined time period of the inactivity timer, the IP session may be determined to be active (act 640), without sending BFD Control packets to router gateway 130 (act 630).

In all of the exemplary embodiments described above relating to process 600, once an IP session is determined to be inactive, appropriate action may be taken, such as notifying an administrator or automatically attempting to renew the IP session.

CONCLUSION

The foregoing description of exemplary embodiments provides illustration and description, but is not intended to be exhaustive or to limit embodiments to the precise form disclosed. Modifications and variations are possible in light of the above teachings or may be acquired from practice of the embodiments. For example, while a series of acts has been described with regard to FIGS. 4-6, the order of the acts may be modified in other implementations. Further, non-dependent acts may be performed in parallel.

For example, implementations consistent with principles of the embodiments can be implemented using devices and configurations other than those illustrated in the figures and described in the specification without departing from the spirit of the embodiments. Devices and/or components may be added and/or removed from the implementations of FIGS.

1-3 depending on specific deployments and/or applications. Further, disclosed implementations may not be limited to any specific combination of hardware.

No element, act, or instruction used in the description of the embodiments should be construed as critical or essential, unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein is defined by the claims and their equivalents.

What is claimed is:

1. A method comprising:
   establishing an Internet Protocol (IP) session between first and second network devices;
      establishing a Bidirectional Forwarding Detection (BFD) session within the established IP session between the first and second network devices;
      receiving, at the first network device, first data that does not include a BFD packet;
      in response to receiving the first data, resetting an inactivity timer at the first network device, where the inactivity timer is to track an amount of time after receiving data from the second network device;
      after resetting the inactivity timer, determining, at the first network device, that the inactivity timer indicates that a predetermined amount of time has passed since receiving the first data, where no data has been received from the second network device since receiving the first data;
      in response to the determining, sending, from the first network device, one or more BFD packets within the established BFD session to the second network device;
      receiving, at the first network device, second data from the second network device; and
   determining, in response to receiving the second data, that the established IP session is active based upon receiving the second data.

2. The method of claim 1, where the first network device is a remote IP device.

3. The method of claim 1, where the first network device is an IP edge device.

4. The method of claim 1, further comprising:
   determining that the established IP session is not active based on not receiving BFD packets for a predetermined period of time.

5. A method comprising:
   establishing a Bidirectional Forwarding Detection (BFD) session within an Internet Protocol (IP) session between first and second network devices;
   at the first network device, receiving a plurality of BFD packets from the second network device;
   receiving data from the second network device, where the data does not include BFD packets; and
   determining whether the IP session is active based on reception of the BFD packets and the received data that does not include BFD packets, where the determining comprises:
      resetting, at the first network device, an inactivity timer upon receiving data that does not include BFD packets from the second network device, and
      upon expiration of the inactivity timer, transmitting a BFD packet from the first network device to the second network device.

6. The method of claim 5, further comprising:
   determining that the IP session is not active when a predetermined time period has passed after the expiration of the inactivity timer without receiving a BFD packet from the second network device in response to the BFD packet transmitted from the first network device to the second network device.

7. The method of claim 5, where the first network device is an IP edge device.

8. The method of claim 5, where the first network device is a remote IP device.

9. The method of claim 1, further comprising:
   generating, at the first network device, an alert that indicates that the inactivity timer has indicated that the predetermined amount of time has passed since receiving the first data.

10. The method of claim 1, further comprising:
    receiving, at the first network device, third data from the second network device;
    in response to receiving the third data, resetting the inactivity timer; and
    before the predetermined amount of time has passed since receiving the third data, receiving, at the first network device, fourth data from the second network device;
    where the first network device does not send a BFD packet to the second device in the time period between receiving the third data and the fourth data.

11. The method of claim 1, further comprising:
    in response to receiving the second data from the second network device, resetting the inactivity timer.

12. The method of claim 1, where the second data includes a BFD packet.

13. A computer-readable memory device, having stored thereon computer-executable instructions executable by one or more processors of a first network device, the computer-executable instructions comprising:
    a set of instructions to establish an Internet Protocol (IP) session between the first network device and a second network device;
       a set of instructions to establish a Bidirectional Forwarding Detection (BFD) session within the established IP session between the first and second network devices;
       a set of instructions to receive, at the first network device, first data that does not include a BFD packet;
       a set of instructions to reset, in response to receiving the first data, an inactivity timer, where the inactivity timer is to track an amount of time after receiving data from the second network device;
       a set of instructions to determine, after resetting the inactivity timer, that the inactivity timer indicates that a predetermined amount of time has passed since receiving the first data, where no data has been received from the second network device since receiving the first data;
       a set of instructions to send, in response to the determining one or more BFD packets within the established BFD session to the second network device;
       a set of instructions to receive second data from the second network device; and
    determining, in response to receiving the second data, that the established IP session is active based upon receiving the second data.

14. The computer-readable memory device of claim 13, where the computer-executable instructions further comprise:

a set of instructions to determine that the established IP session is not active based on not receiving BFD packets for a predetermined period of time.

15. The computer-readable memory device of claim 13, where the first network device is a remote IP device.

16. The computer-readable memory device of claim 13, where the first network device is an IP edge device.

17. A first network device comprising:

a processor; and a memory to store instructions, which, when executed by the processor, cause the processor to implement:

means for establishing an Internet Protocol (IP) session between the first network device and a second network device;

means for establishing a Bidirectional Forwarding Detection (BFD) session within the established IP session between the first and second network devices;

means for receiving, at the first network device, first data that does not include a BFD packet;

means for resetting, in response to receiving the first data, an inactivity timer at the first network device, where the inactivity timer is to track an amount of time after receiving data from the second network device;

means for determining, after resetting the inactivity timer, that the inactivity timer indicates that a predetermined amount of time has passed since receiving the first data, where no data has been received from the second network device since receiving the first data;

means for sending, in response to the determining, one or more BFD packets within the established BFD session to the second network device;

means for receiving second data from the second network device; and means for determining, in response to receiving the second data, that the established IP session is active based upon receiving the second data.

18. The first network device of claim 17, further comprising:

means for determining that the established IP session is not active based on not receiving BFD packets for a predetermined period of time.

19. The first network device of claim 17, where the first network device is a remote IP device.

20. The first network device of claim 17, where the first network device is an IP edge device.

* * * * *